(12) United States Patent
Milstein

(10) Patent No.: US 8,631,145 B2
(45) Date of Patent: *Jan. 14, 2014

(54) SYSTEM AND METHOD FOR PLAYING CONTENT ON CERTIFIED DEVICES

(75) Inventor: Lee Milstein, San Diego, CA (US)

(73) Assignee: Sonic IP, Inc., Santa Clara, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/611,042

(22) Filed: Nov. 2, 2009

(65) Prior Publication Data

US 2010/0115631 A1 May 6, 2010

Related U.S. Application Data

(60) Provisional application No. 61/110,297, filed on Oct. 31, 2008.

(51) Int. Cl.
G06F 15/16 (2006.01)

(52) U.S. Cl.
USPC ............ 709/231; 709/230; 726/3; 726/2

(58) Field of Classification Search
USPC .......................................... 726/30
See application file for complete search history.

(56) References Cited

U.S. PATENT DOCUMENTS

| 5,517,250 | A | 5/1996 | Hoogenboom et al. |
|---|---|---|---|
| 5,959,690 | A | 9/1999 | Toebes, VIII et al. |
| 5,987,212 | A | 11/1999 | Kim et al. |
| 6,141,385 | A | 10/2000 | Yamaji |
| 6,233,251 | B1 | 5/2001 | Kurobe et al. |
| 6,360,368 | B1 | 3/2002 | Chawla |
| 6,453,115 | B1 | 9/2002 | Boyle |
| 6,512,881 | B1 | 1/2003 | Kinebuchi et al. |
| 6,577,589 | B1 | 6/2003 | Sawabe et al. |
| 6,934,837 | B1 | 8/2005 | Jaisimha et al. |
| 7,519,274 | B2 | 4/2009 | Li |
| 7,733,366 | B2 | 6/2010 | Beavers et al. |
| RE42,398 | E * | 5/2011 | Tanaka et al. .................. 711/163 |
| 8,001,608 | B2 * | 8/2011 | Venters et al. .................. 726/26 |
| 8,301,793 | B2 * | 10/2012 | Soroushian et al. .......... 709/231 |
| 2001/0055302 | A1 | 12/2001 | Taylor et al. |
| 2002/0032747 | A1 | 3/2002 | Toki |
| 2002/0062313 | A1 | 5/2002 | Lee et al. |

(Continued)

OTHER PUBLICATIONS

International Search Report for International Application No. PCT/US 09/63005, date completed Jan. 18, 2010, date mailed Feb. 2, 2010, 2 pgs.

(Continued)

Primary Examiner — Pramila Parthasarathy
(74) Attorney, Agent, or Firm — KPPB LLP

(57) ABSTRACT

Systems and methods of ensuring a predetermined quality of playback of media content are provided. The predetermined quality is determined by an encoder placing a passive flag or data field within a media file having a predetermined quality. The contents of the media file in which the passive flag or data field is located is not encrypted or designated within a particular standard. A decoder plays the media content within the media file upon detection of the passive flag or data field or in accordance with a value within the passive flag or data field and the certification of the device.

10 Claims, 3 Drawing Sheets

(56) References Cited

U.S. PATENT DOCUMENTS

| | | |
|---|---|---|
| 2002/0108112 A1 | 8/2002 | Wallace et al. |
| 2003/0033569 A1 | 2/2003 | Klein Middelink et al. |
| 2003/0131251 A1 | 7/2003 | Fetkovich |
| 2003/0202773 A1 | 10/2003 | Dow et al. |
| 2004/0109393 A1 | 6/2004 | Hahn |
| 2005/0080743 A1 | 4/2005 | Ostrover et al. |
| 2005/0099869 A1 | 5/2005 | Crinon et al. |
| 2005/0144468 A1 | 6/2005 | Northcutt et al. |
| 2005/0238057 A1 | 10/2005 | Toma et al. |
| 2006/0050697 A1 | 3/2006 | Li et al. |
| 2006/0146780 A1 | 7/2006 | Paves |
| 2006/0206493 A1 | 9/2006 | Lipscomb et al. |
| 2007/0033419 A1 | 2/2007 | Kocher et al. |
| 2007/0168541 A1 | 7/2007 | Gupta et al. |
| 2008/0215317 A1 | 9/2008 | Fejzo |
| 2009/0083809 A1 | 3/2009 | Hayashi et al. |
| 2009/0119594 A1 | 5/2009 | Hannuksela |
| 2013/0114944 A1 | 5/2013 | Soroushian et al. |

OTHER PUBLICATIONS

Written Opinion of the International Searching Authority for International Application No. PCT/US 09/63005, date completed Jan. 18, 2010, date mailed Feb. 2, 2010, 4 pgs.

International Search Report for International Application No. PCT/US 08/83832, date completed Jan. 8, 2009, date mailed Jan. 28, 2009, 2 pgs.

Written Opinion by the International Searching Authority for International Application No. PCT/US 08/83832, date completed Jan. 9, 2009, date mailed Jan. 28, 2009, 5 pgs.

Grimen et al., "Software-Based Copy Protection for Temporal Media During Dissemination and Playback", Information Security and Cryptology—ICISC 2005 Lecture Notes in Computer Science; LNCS, Springer, Berlin, DE, Jan. 1, 2006, pp. 362-377.

Hughes, G., "Read Channels for Prepatterned Media With Trench Playback", IEEE Transactions of Magnetics, vol. 39, No. 5, Sep. 1, 2003, pp. 2564-2566.

* cited by examiner

SYSTEM AND METHOD FOR PLAYING CONTENT ON CERTIFIED DEVICES

CROSS REFERENCE TO RELATED APPLICATIONS

The application claims the benefit of U.S. Provisional Patent Application No. 61/110,297, filed Oct. 31, 2008, the entire disclosure of which is hereby incorporated by reference as if set forth in full herein.

BACKGROUND

The present invention generally relates to playback of media files and more specifically to systems and methods for providing assurances of a predetermined quality of playback.

Media files are created by a variety of encoders, which can be implemented in hardware and/or software. In order to enable playback of the media file on a variety of devices, media files are typically encoded in accordance with a defined standard. A considerable degree of flexibility is provided by most video standards, and therefore the quality of the viewing experience varies depending upon the implementation of the encoder used to encode the media file and the decoder used to render the media file. The increasing array of options for the distribution of content has resulted in the ability to obtain a single piece of content in a variety of formats and, in many instances, in different variants of a single format. The variety in decoder quality creates uncertainty on the part of content owners as to the quality of their content when played back by viewers. Likewise, the variance in encoder quality creates uncertainty on the part of viewers as to the quality of a piece of content when rendered using a premium playback device.

Security is another concern for content owners. Therefore, encryption techniques and/or watermarking techniques are often applied to media files to prevent playback of the media file by unauthorized users and to identify sources of unauthorized copies of the media file. When a file is encrypted, the data within the file is obfuscated and a piece of information such as an encryption key is required to access the media file "in the clear". A watermark is information that is embedded within the media file. Watermarks are typically designed so that their location cannot be determined from inspection of the file. Maintaining the secrecy of the location of the watermark is important in preventing removal of the watermark.

Additionally, content control by a content viewer, such as parental control, can be a concern. In such cases, content is typically available to be decoded but is not decoded due to a setting introduced by the content viewer to restrict displaying of the content or to display only portions of the content. For example, an "R" rated movie may be prevented from being displayed by activating a parental control setting that restricts displaying of such rated content. As such, this selective feature is set and governed by the content viewer or decoder owner.

DETAILED DESCRIPTION

Systems and methods for providing assurances of a predetermined quality of playback for media content in accordance with embodiments of the invention are described. In a number of embodiments, content is encoded using a standards-based encoder known to produce media files of a predetermined level of quality. The fact that the resulting media file was encoded using the high quality encoder is indicated within the media file by a passive flag or data field that is inserted into the media file during encoding. In many embodiments, the passive flag or data field is not part of the standard and is provided in the clear so that any decoder can determine the location of the passive flag or data field and read its value. The fact that the passive flag or data field does not form part of the standard does, however, mean that the information is neither expected nor intelligible to a decoder that is simply implemented in accordance with the standard. The quality of playback of a media file encoded using the high quality encoder depends upon the implementation of the decoder. In many embodiments, manufacturers can submit decoders to a certification authority to determine whether the decoder implementation renders media files encoded using the high quality encoder with a predetermined level of quality. In the event that the decoder exceeds the required quality threshold, then the certification authority certifies the device. As a condition of certification, the manufacturer of certified devices is required to prevent playback of media files encoded using the high quality encoder on devices for which the manufacturer is unwilling to obtain certification. So called "non-certified" devices include decoders that inspect media files for the passive flag or data field, which is only present in media files encoded using the high quality encoder. When the value, which is unique to files encoded using the high quality encoder, is located the "non-certified" player is configured to prevent playback of the media file.

The limitation that content encoded using the high quality encoder can only be played back on devices certified as providing a predetermined level of quality provides content owners with an assurance that they can digitally distribute content that will playback with a predetermined level of quality. Similarly, obtaining a media file encoded using the high quality encoder and a certified playback device provides viewers with an assurance that the content will playback with a predetermined level of quality.

Although much of the discussion below references standards-based encoders and decoders, many embodiments of the invention utilize encoders and decoders that implement extensions to the standard. Such encoders and decoders support all, or a majority, of the features required by the standard, but also posses additional capabilities that are beyond the scope of the standard.

Figure 1:
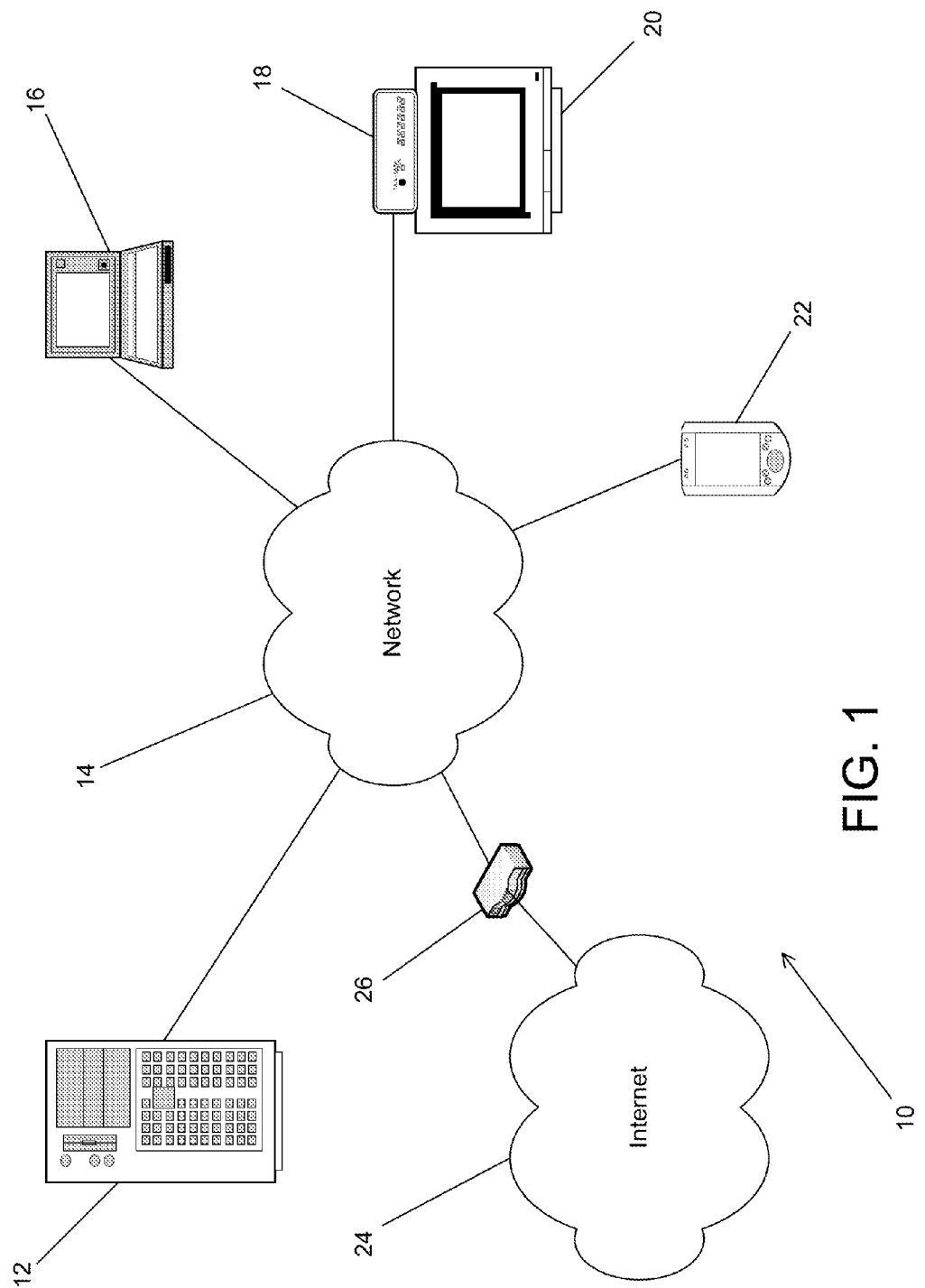
FIG. 1 is a block diagram of a media file playback system in accordance with one embodiment of the invention.

A multi-media file playback system in accordance with an embodiment of the invention is shown in FIG. 1. The playback system 10 includes a media server 12 connected to a network 14. Media files are stored on the media server 12 and can be accessed by devices configured with a client application. In the illustrated embodiment, devices that access media files on the media server include a personal computer 16, a consumer electronics device such as a set top box 18 connected to a display device such as a television 20, and a portable device such as a personal digital assistant 22 or a mobile phone handset. The playback devices and the media server 12 can communicate over a network 14 that is connected to the Internet 24 via a gateway 26. In other embodiments, the media server 12 and the playback devices communicate over the Internet. In a number of embodiments, the media server provides content encoded using a specific type of encoder that produces standards-based media files capable of playback with a predetermined level of quality on a playback device certified to support that level of playback quality.

In other embodiments, media files are distributed via fixed media such as optical disk or non-volatile memory. Media files encoded in accordance with embodiments of the invention and playback of such media files are discussed further below.

It should be appreciated that a decoder for such encoded media files could be provided as hardware or software embedded or otherwise operating within a given platform or playback device. The playback device in various embodiments includes but is not limited to computers, mobile computers, phones, set top boxes, digital or interactive televisions, disc players, game consoles or other standalone or peripheral devices capable of providing or executing the decoding of the encoded media file.

Figure 2:
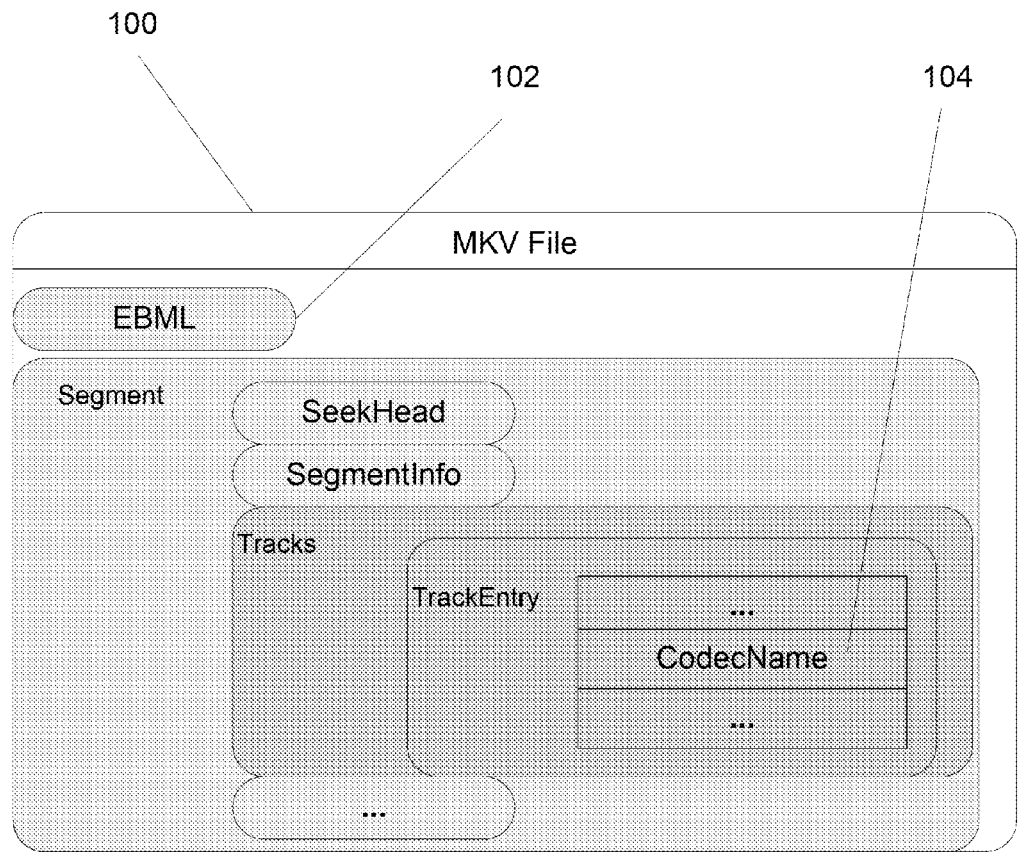
FIG. 2 is a conceptual illustration of media file encoded in accordance with an embodiment of the invention.

A media file encoded in accordance with an embodiment of the invention is illustrated in FIG. 2. The media file 100 includes a header containing a passive flag or data field 102 that is not specified by the standard. In the case of the MKV container specification, the passive flag or data field is implemented in a Codec_Name field in the MKV container. In one embodiment, the Codec_Name message includes within its payload a data field indicating the encoder that encoded the media file. As discussed above, the passive flag or data field is not present in media files encoded by other encoders. Decoders that implement the basic standard will not understand and/or discard the passive flag. In addition to including a passive flag or data field in the media file header, a passive flag or data field 104 can also be included in each of the tracks within the media flag. In this way, a media file can contain multiple pieces of content. However, content encoded using the high quality encoder can be identified using the passive flag or data field 104, which is not present in content encoded using other encoders. In a number of embodiments, the passive flag or data field is implemented in a track encoded in accordance with H.264 as an H.264 user_data_unregistered message.

As discussed above, certified devices can playback all files and need not check for the passive flag or data field. In effect, the certified devices can disregard the passive flag or data field and simply playback all standards-based content. The owner of the certified playback device need simply acquire content encoded using the high quality encoder to obtain the desired predetermined level of playback quality.

In many instances, manufacturers of non-certified devices may also wish to manufacture less expensive devices for which certification of a predetermined level of quality is unimportant. Were the manufacturer to simply implement a decoder in accordance with the relevant standard(s), the non-certified device might be capable of playing back content encoded using the high quality encoder (though possibly at decreased levels of quality). Therefore, the certification process requires manufacturers to agree to manufacture non-certified devices that refuse to play back a media file possessing a header that include a passive flag or data field inserted by the high quality encoder or to play back a track within a media file where the track includes a passive flag or data field inserted by the high quality encoder.

Figure 3:
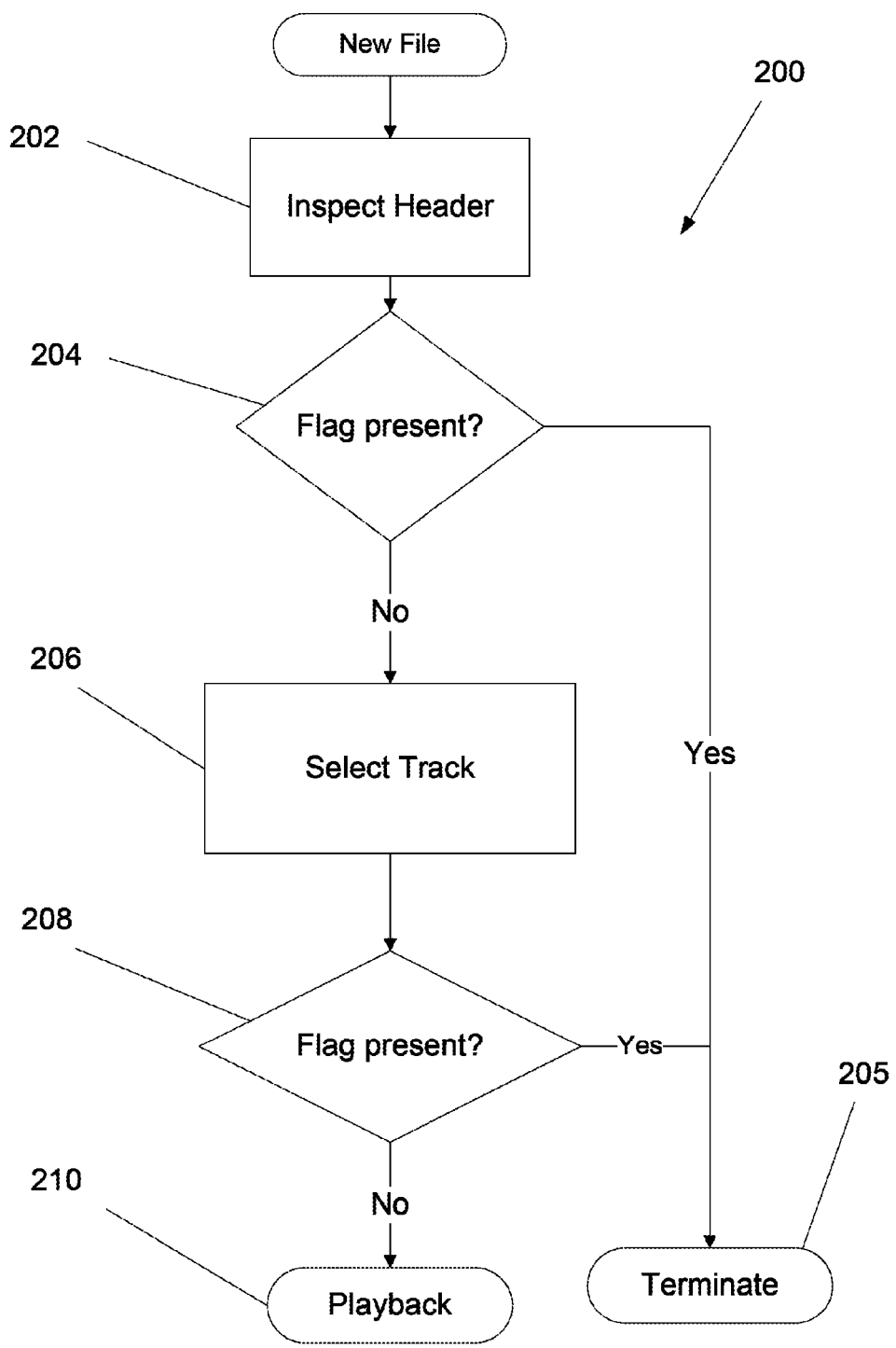
FIG. 3 is a flowchart illustrating a process for playback of media files by a non-certified playback device in accordance with an embodiment of the invention.

A process for decoding a media file and preventing playback of media files encoded using a predetermined encoder in accordance with an embodiment of the invention is illustrated in FIG. 3. The process 200 commences when a media file is received. The header is inspected (202) and a determination (204) made as to whether or not the passive flag or data field is present in the file. In a number of embodiments, the value of the passive flag or data field is irrelevant, its mere presence within the file is sufficient to prevent (205) rendering of media within the file on a display device. In other embodiments, the actual value of the passive flag or data field is checked prior to determining whether to proceed with playback of the file. A check may be required where a general-purpose data field is modified for the specific purpose of including data identifying that the media file was encoded by the high quality encoder. It is significant that the passive flag or data field is not present in the file format specified by the relevant standard. Many media file formats do not specify a manner in which to identify the encoder that encoded the media file. Therefore, a separate data field must be added to provide this additional piece of information not present in files encoded in accordance with specifications such as the MKV container format or the H.264 format. When decoded by a standards-based decoder, the passive flag or data field is neither expected nor intelligible. Consequently, the addition of a passive flag or data field requires a coordinated modification to the high quality encoder. In the event that the passive flag or data filed is not present, a track is selected (206). Prior to playback, a determination (208) is made as to whether the track was encoded by the high quality encoder. The determination involves checking the track to ascertain whether a passive flag or data field was inserted into the track during encoding by the high quality encoder. In the event that the flag or data field is present and/or matches a predetermined value, then rendering of the track on a display is prevented (205). Upon a determination that the track was not encoded using the high quality encoder, rendering (210) of the track on a display device can proceed.

In one embodiment, a database is provided that includes multiple records having identifiers, e.g., model numbers or a similar indicator of the manufacture and the feature types provided by a particular playback device or decoder. Upon retrieval or receipt of a media file, extraction, access or detection of the flag or data field is performed. When the flag or data field is found, the device or decoder identifier is compared or used as a query to compare the identifier to the stored records. If a match occurs and the device plays or decodes the associated media file, the device and/or record is tagged or marked. Such marked devices are deemed to be non-certified devices and violating the ability to provide a specific quality of content. In one embodiment, when the flag or data field is present and the device fails to locate it or fails to try to locate it, the device or decoder is identified. If a match occurs, the device is marked. In one embodiment, playback of the media file is always allowed, but a match still marks the device. In one embodiment, marked devices are recorded in the database, or messages/notifications are generated identifying the marked device.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

The invention claimed is:

1. A playback device capable of playing a media file according to a predetermined quality of playback, the playback device comprising:
  a decoder configured to receive a media file in which the decoder is capable of playing the media file, wherein the media file is in the MKV container format;

wherein the decoder is configured to detect a first passive flag or data field implemented in a Codec_Name field in the header of the media file and a second passive flag or data field implemented within a track within the media file as a user_data_unregistered message, wherein the media file has a portion unencrypted the first passive flag or data field and the second passive flag or data field are located within the unencrypted portion, and the first passive flag or data field and the second passive flag or data field indicate that the media file was encoded using a high quality encoder to a predetermined quality;

wherein the decoder is configured to detect the first passive flag or data field and the second passive flag or data field and to not playback the media file without prior interaction by a user.

2. The device of claim 1 wherein the decoder is configured to playback the media file when the decoder does not detect the passive flag or data field.

3. The device of claim 1 wherein the media file is encoded by a high quality encoder indicated within the media file by the passive flag or data field.

4. The device of claim 1 wherein the media file is stored and remotely transmitted to the decoder.

5. The device of claim 1 wherein the media file is stored and locally provided to the decoder.

6. A system of ensuring a predetermined quality of playback of media files, the system comprising:

a server configured to access and transmit a media file, wherein the media file is in the MKV container format;

a playback device configured to request the media file and having a decoder configured to extract and display media content from the media file;

wherein the decoder is configured to detect a first passive flag or data field implemented in a Codec_Name field in the header of the media file and a second passive flag or data field implemented within a track within the media file as a user_data_unregistered message;

wherein the decoder is configured to play the media content from the media file based on the first passive flag or data field and the second passive flag or data field; and wherein the first passive flag or data field and the second passive flag or data field indicate that the media file was encoded using a high quality encoder to a predetermined quality.

7. The system of claim 6 wherein the decoder plays the media content based on the passive flag or data field.

8. The system of claim 6 wherein the decoder does not play the media content based on the passive flag or data field.

9. The system of claim 7 wherein the playback device is designated as non-certified, the decoder plays the media content, and an identifier for the playback device is recorded in a database on the server.

10. The system of claim 6 further comprising a media generation device comprising an encoder configured to encode media content according to a predetermined standard as a media file, the encoder including a passive flag or data field within the media file when the media content is a predetermined quality.

* * * * *